US007878891B2

(12) United States Patent
Chiu

(10) Patent No.: US 7,878,891 B2
(45) Date of Patent: Feb. 1, 2011

(54) GENERATING POLYOMINO VIDEO GAME PIECES AND PUZZLE PIECES FROM DIGITAL PHOTOS TO CREATE PHOTOMINOES

(75) Inventor: Patrick Chiu, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 879 days.

(21) Appl. No.: 11/668,417

(22) Filed: Jan. 29, 2007

(65) Prior Publication Data

US 2008/0182635 A1    Jul. 31, 2008

(51) Int. Cl.
    *A63F 9/24*     (2006.01)
(52) U.S. Cl. ............................................. 463/9; 463/11
(58) Field of Classification Search .................... 463/9, 463/11; 273/157
    See application file for complete search history.

(56) References Cited

U.S. PATENT DOCUMENTS

| | | | | |
|---|---|---|---|---|
| 4,583,742 A | * | 4/1986 | Slinn | 273/260 |
| 5,465,982 A | * | 11/1995 | Rebane | 463/9 |
| 5,605,332 A | * | 2/1997 | Harnett | 273/157 R |
| 5,643,084 A | * | 7/1997 | Mirsky | 463/9 |
| 5,868,388 A | * | 2/1999 | Wood et al. | 273/157 R |
| 6,663,732 B1 | * | 12/2003 | Link | 156/63 |
| 6,666,453 B2 | * | 12/2003 | Chambers | 273/157 R |
| 7,510,187 B2 | * | 3/2009 | Haag | 273/157 R |
| 2004/0082374 A1 | * | 4/2004 | Maya et al. | 463/16 |
| 2004/0251627 A1 | * | 12/2004 | Verhoeven | 273/153 R |
| 2005/0220345 A1 | | 10/2005 | Chiu et al. | |
| 2005/0220348 A1 | | 10/2005 | Chiu et al. | |
| 2006/0061598 A1 | * | 3/2006 | Mino et al. | 345/629 |
| 2006/0062455 A1 | | 3/2006 | Chiu et al. | |
| 2006/0062456 A1 | | 3/2006 | Chiu et al. | |
| 2006/0252519 A1 | * | 11/2006 | Walker et al. | 463/25 |
| 2007/0242088 A1 | * | 10/2007 | Kim et al. | 345/660 |

OTHER PUBLICATIONS von Ahn, Luis, et al., "Labeling Images with a Computer Game," ACM, Proceedings of CHI 2004, Apr. 24-29, 2004, Vienna, Austria, 8 pages.

von Ahn, Luis, et al., "Peekaboom: A Game for Locating Objects in Images," ACM, Proceedings of CHI 2006, Apr. 22-27, 2006, Montreal, Quebec, Canada, pp. 55-64.

Chiu, Patrick, et al., "Stained-Glass Visualization for Highly Condensed Video Summaries," Proc. IEEE International Conference on Multimedia and Expo (ICME 2004), 4 pages.

Cowtris Video Game, http://www.totalvideogames.com/pages/downloads/?dsec=download&did=2830, viewed Feb. 7, 2007, 1 page.

Fletcher, John G., "A Program to Solve the Pentomino Problem by the Recursive Use of Macros," Communications of the ACM, vol. 8, No. 10, Oct. 1965, pp. 621-623.

(Continued)

*Primary Examiner*—James S McClellan
*Assistant Examiner*—Ankit Doshi
(74) *Attorney, Agent, or Firm*—Morgan, Lewis & Bockius LLP

(57) ABSTRACT

Generation of video game photominoes is provided by constructing polyomino game pieces from the salient parts of digital photographic images. Further, generation of jigsaw puzzle photominoes is provided by constructing polyomino puzzle pieces from the salient parts of digital photographic images.

12 Claims, 10 Drawing Sheets

OTHER PUBLICATIONS

Fujifilm Finepix V10 Digital Camera 2006, Fujifilm Press Release, http://fujifilmusa.com/JSP/fuji/epartners/PRPrintableNewsDetail.jsp?DBID=News 842820, viewed on Jan. 25, 2007, 6 pages.

Girgensohn, Andreas, et al., "Stained Glass Photo Collages," UIST '04 Poster, ACM, Oct. 24-27, 2004, Santa Fe, New Mexico, USA, 2 pages.

Golomb, Solomon W., Polyominoes, $2^{nd}$ Edition, Princeton University Press, Princeton, N. J., 1994, 8 pages.

Google Image Labeler, http://images.google.com/imagelabeler/, viewed on Jan. 24, 2007, 1 page.

Itti, Laurent, et al., "A Model of Saliency-based Visual Attention for Rapid Scene Analysis," IEEE Transactions on Pattern Analysis and Machine Intelligence, vol. 20, No. 11, 1998, 5 pages.

Knuth, Donald E., "Dancing Links," Millennial Perspectives in Computer Science, 2000, 26 pages.

Krazit, Tom, "HP Labs Marks $40^{th}$ with High-Tech Coffee Table," CNET News, Feb. 22, 2006, http://news.com.com/HP+Labs+marks+40th+with+high-tech+coffee+table/2100-1008_3-6041758.html, 2 pages.

StainedGlass Collage, http://www.stainedglasscollage.com/?feature=1, viewed on Feb. 8, 2007.

Sun, Xiaohua, et al., "Implicit Brushing and Target Snapping: Data Exploration and Sense-Making on Large Displays," ACM, Proceedings of AVI '06, May 23-26, 2006, Venezia, Italy, pp. 258-261.

Puzzle Express, http://get.games.yahoo.com/proddesc;_ylc=X3IDMgRtcANibARwb3MDMTUxBHNIYwNscG8Ec2xrA1bvcHBpdCE-?gamekey=puzzleexpress, viewed on Feb. 7, 2007, 1 page.

Holiday Express, http://get.games.yahoo.com/proddesc;_ylc=XIDMgRtcANibARwb3MDODMEc2VjA2xwbwRzbGsDSGFydmVzdCBNYW5pYQ—?gamekey=holidayexpress, viewed on Feb. 7, 2007, 1 page.

Ocean Express, http://get.games.yahoo.com/proddesc;_ylc=X3IDMgRtcANibARwb3MDMTI5BHN1YwNscG8Ec2xrA01vc2FpYw—?gamekey=oceanexpress, viewed on Feb. 7, 2007, 1 page.

* cited by examiner

GENERATING POLYOMINO VIDEO GAME PIECES AND PUZZLE PIECES FROM DIGITAL PHOTOS TO CREATE PHOTOMINOES

FIELD OF THE INVENTION

This invention relates generally to the field of digital photographic images and more particularly to generating polyomino video game pieces and puzzle pieces from digital photographic images.

BACKGROUND OF THE INVENTION

A large amount of digital photos are being created with the ubiquitous digital cameras, camera cellphones, and personal digital assistants (PDAs). Significant opportunities exist for new applications that deal with digital photos. Video games and puzzles are two applications that already have a large user base.

Current video games that uses photos include different versions of an online photo tagging game that has attracted a large number of players, a game that locates objects in photos, and a tabletop computer game that plays like a word game and tags photos. Other current video applications work with photos but these applications are not games. Further, current online services and computer applications exist for printing traditional photo jigsaw puzzles with curvy pieces. Portions of photographic images that appear on the pieces, however, are created from a fixed solution pattern or seem to be arbitrarily generated from the images.

Other current video games use polyomino pieces. Polyominoes are generalizations of dominoes, as they are geometric game pieces constructed from connecting n square blocks together with adjacent edges and corners aligned. Polyominoes are not only fun to play with, they have been seriously studied by computer scientists and mathematicians. For the general public and non-specialists, the most popular forms of polyominoes are tetrominoes (n=4) and pentominoes (n=5). These cases provide enough complexity to be fun but not too much as to be frustratingly difficult. In these current games, the user moves, rotates and places the pieces on a pre-defined area to fill up rows. The pieces are simply colored and some are decorated with icons to indicate bonuses. Some pre-defined areas are rectangular and some non-rectangular. These areas also have some strategically located squares that are eliminated. As the rows are filled up by the user, they disappear to reveal a picture in the background. The user can customize the game by adding photos for the background.

Tetromino "falling blocks" video games, such as Tetris, are released on a large spectrum of platforms. More generally, a "falling blocks" video game can have polyominoes composed of k square blocks, where k is a positive integer. These games are immensely popular in many countries around the world. A random sequence of tetrominoes, or shapes composed of four square blocks each, fall down the playing field. The object of these games is to manipulate these tetrominoes, by moving each one sideways and rotating it by 90 degree units, with the aim of creating a horizontal line of blocks without gaps. When such a line is created, it disappears, and the blocks above if any fall. The games end when the player "tops out," that is, when the stack of tetrominoes reaches the top of the playing field and no new tetrominoes are able to enter. Current variations of "falling blocks" have pictures drawn on the pieces. An amusing example is one that has cows on the pieces. These are pre-drawn cartoon pictures and not photographic images, however.

What is needed is a method of generating polyomino game pieces constructed from the salient parts of digital photographic images for use in polyomino video games. Further, what is needed is a method of generating polyomino jigsaw puzzle constructed from the salient parts of digital photographic images for use in polyomino jigsaw puzzles.

SUMMARY OF THE INVENTION

Generation of video game photominoes is provided by constructing polyomino game pieces from the salient parts of digital photographic images. Further, generation of jigsaw puzzle photominoes is provided by constructing polyomino puzzle pieces from the salient parts of digital photographic images.

BRIEF DESCRIPTION OF THE DRAWINGS

Preferred embodiment(s) of the present invention will be described in detail based on the following figures, wherein.

DETAILED DESCRIPTION OF THE INVENTION

Polyominoes and Photominoes Basics

As described above, polyominoes are generalizations of dominoes, as they are geometric game pieces constructed from connecting n square blocks together with adjacent edges and corners aligned.

Figure 1:
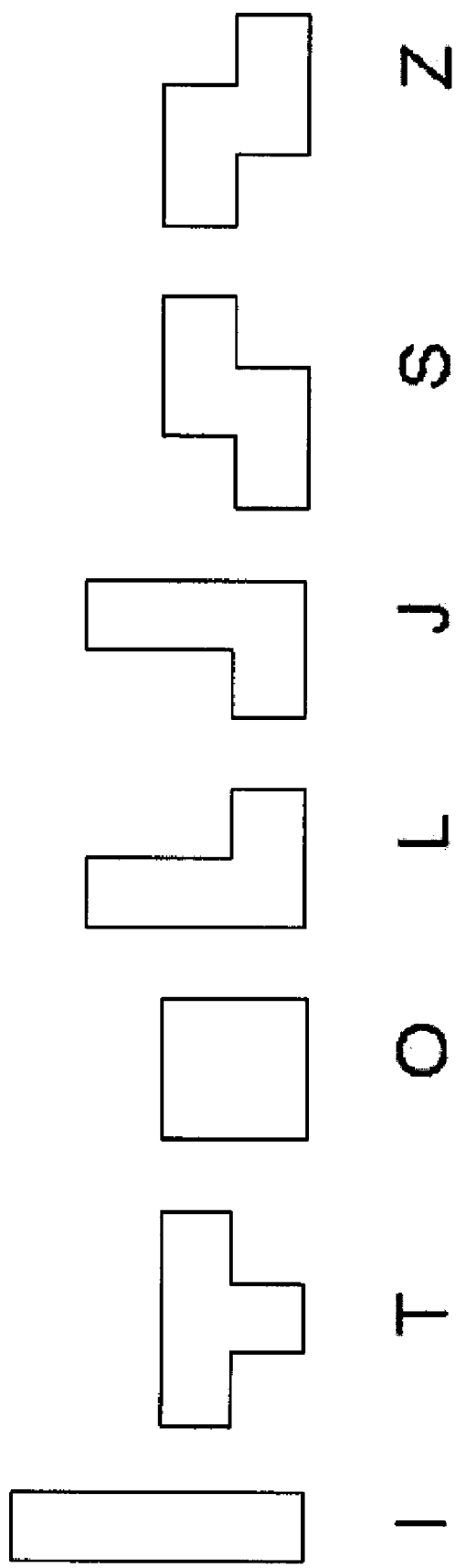
FIG. 1 shows variations in shape of tetrominoes.

FIG. 1 shows variations in shape of tetrominoes. Tetrominoes are polyominoes for n=4, where n is the number of squares of the polyomino. For tetrominoes, there are seven piece types modulo, or without, rotations. The names of these pieces are I, J, L, O, S, T, and Z, which relate to the shapes of their corresponding pieces, are shown in FIG. 1.

Regarding rotations, if looking at a particular tetromino on an x-axis and y-axis of a screen, for example, a rotation is a ninety-degree turn around a z-axis that theoretically would be coming straight out of the screen. Thus, for each piece, there could be up to three non-trivial rotations in ninety-degree increments at ninety degrees, 180 degrees and 270 degrees from the original position of the piece. For example, the "O"

piece has no rotations because any of these three rotations yields the same shape. The "T" piece, on the other hand, has three rotations.

Regarding flips, there are two sets of pieces that are "flips" of each other. The "L" and "J" pieces are flips or mirrors of each other, and "S" and "Z" pieces are flips of each other.

These seven tetrominoes do not admit a perfect tiling of a rectangle, so tetrominoes do not yield the most elegant jigsaw puzzles. It is possible, however, to tile a rectangle with various combinations of tetrominoes, such as an eight by five rectangle using ten pieces. In addition to jigsaw puzzles, the games that are inextricably associated with tetrominoes are the "falling blocks" video games, such as Tetris.

Figure 2:
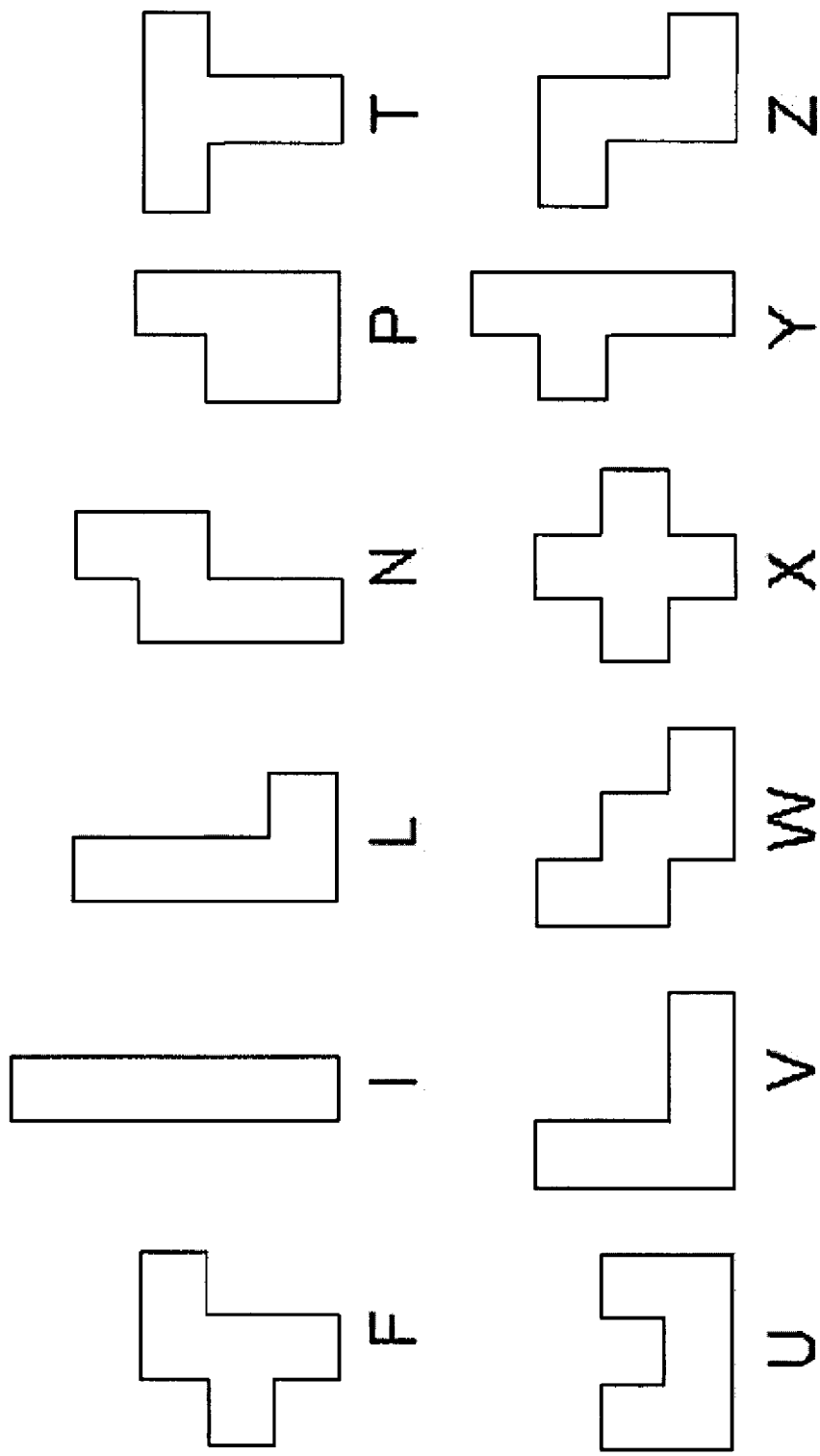
FIG. 2 shows variations in shape of pentominoes.

FIG. 2 shows variations in shape of pentominoes. Pentominoes are polyominoes for n=5, where n is the number of squares in the polyomino. For pentominoes, there are twelve piece types modulo, or without, rotations and flips. The names of these pieces are F, I, L, N, P, T, U, V, W, X, Y, and Z, which relate to the shapes of their corresponding pieces, are shown in FIG. 2.

These twelve pentominoes admit a tiling of a rectangle and yield an elegant jigsaw puzzle. The solutions are not unique. For example, for a ten by six rectangle, there are 2,339 solutions. In embodiments, it is possible to have a variation of a "falling blocks" video game based on pentominoes, but the game may be a bit too unwieldy or difficult to play.

"Photominoes" are polyomino game pieces constructed and rendered from visually salient parts detected in photos or images. Photominoes can be computed from either image streams or from a fixed image set, where an image is one frame of an image stream, or video sequence, and a fixed image set is a set of photos. Although either photos or images can be used with the process, for purposes of clarity and brevity the term "image" will be used hereinafter to refer to both terms "photo" and "image."

In embodiments, it is possible to generate photominoes from videos by extracting keyframes and making photominoes out of these images. It is also possible to generate Photominoes from slides, for example PowerPoint, and other kinds of images.

Generating Photominoes for Video Games

Figure 3:
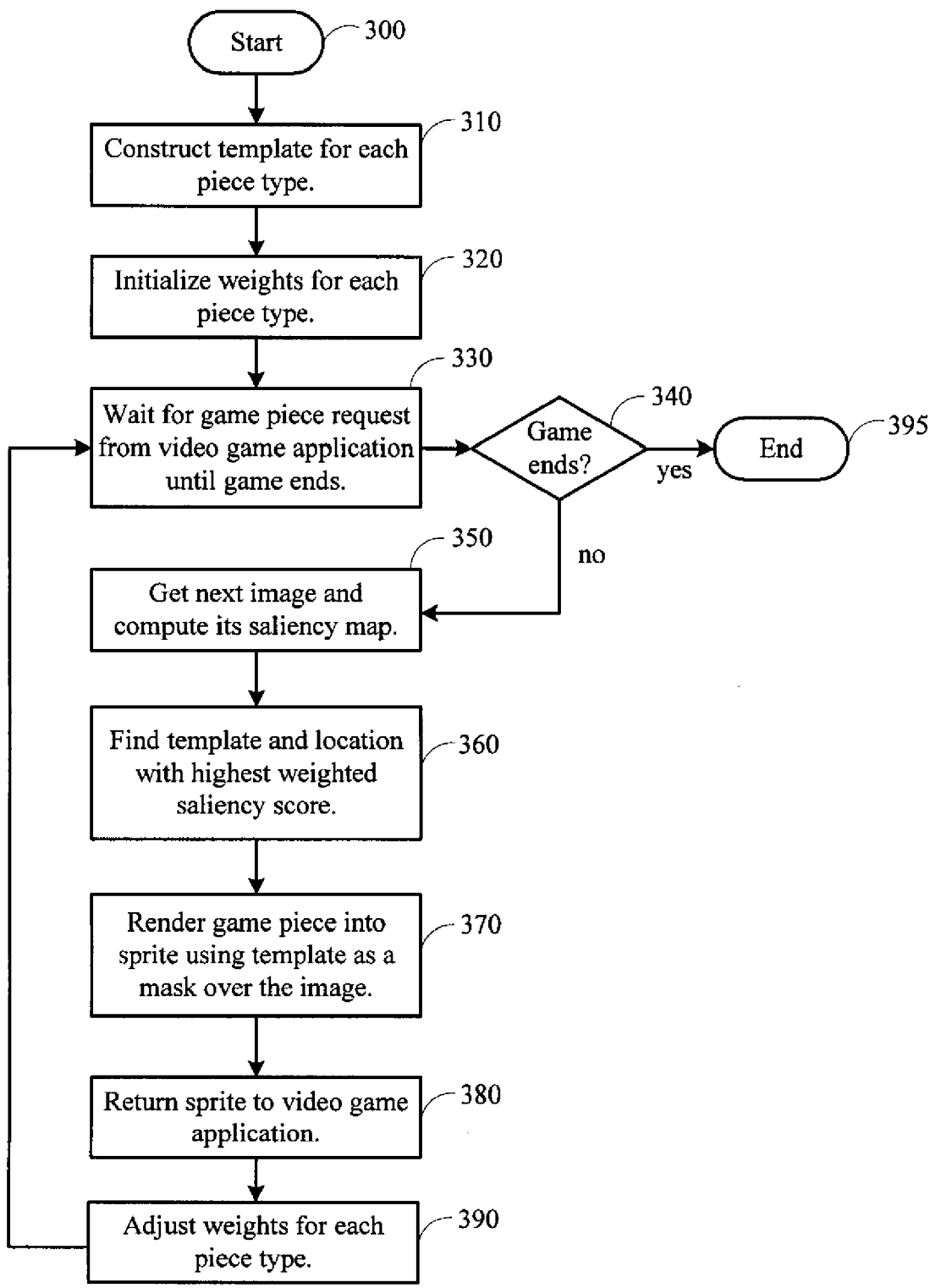
FIG. 3 is a flowchart of a process for generating photominoes as used in a video game, according to embodiments.

FIG. 3 is a flowchart of a process for generating photominoes as used in a video game, according to embodiments. Photominoes can be defined as polyominoes rendered with salient parts detected from photos or images. Photominoes in the case of n=4 are photo tetrominoes. Photo tetrominoes can be used to produce photo-based variations of games such as "falling blocks" video games, such as Tetris. In embodiments, the following process, however, is for the more general version of generating photo polyominoes for any video game. Thus, these embodiments include polyomino cases for n of any positive integer. Further, in embodiments, even within the same game, the number n for each polyomino can vary.

The process starts in step 300. For purposes of constructing photominoes, a computer program keeps an enumerated list of the polyomino of size=n piece types, including piece types obtained by rotations and flips. Let P* denote this expanded list. For example, for a polyomino of n=4, or tetrominoes, P* is the set of basic piece types and flips shown in FIG. 1, plus all combinations of rotations and flips of these pieces. In step 310, a template is constructed for each piece type in the P* list from the computer program. In step 320, the weight of each piece type from step 310 is initialized to the same weight.

In step 330, the process waits for a game piece request from the video game application as dictated by the action of the game until the game ends. As the process waits, a sequence of player actions and game events continues. At some point of the play, a game piece may be needed in the application, and the video game application requests a photomino from a photomino software module. If the game does not end in step 340, then a game piece request was received from the video game application.

In step 350 an image is randomly chosen from a photo repository, and the image's saliency map is computed. In embodiments, the photo repository can be created by a user through a user interface, in which the user downloads images to the repository and selects images from the repository. In embodiments, the photomino software module uses a default directory of images on a personal computer, such as the "My Pictures" directory, if the application is running on a personal computer, for example. A stream of photominoes will be generated one at a time from this repository of images, rather than computing all the game pieces at once.

For each image, a saliency map is computed. The saliency map can be expressed as a real-valued function on points or block areas in the image. For example, a rectangular image can be partitioned into areas by dividing it evenly into an 8×8 grid of blocks. The saliency value of a block can be computed based on low-level image features such as texture, color, and shape, as well as on high-level features such as a face detected in the image. The saliency value of a block can also be computed based on heuristics such as the center of a photograph being more likely to be important, where in heuristics the most appropriate solution of several found by alternative methods is selected at successive stages of a program for use in the next step of the program. Currently, there are various methods to compute the saliency map. In the preferred embodiment a proprietary method is used.

Figure 4D:
FIGS. 4A-4H show examples of images and photo tetrominoes created from corresponding salient parts of the images, according to embodiments.
Figure 4C:
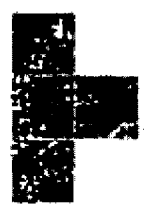
Figure 4H:
Figure 4G:
Figure 4B:
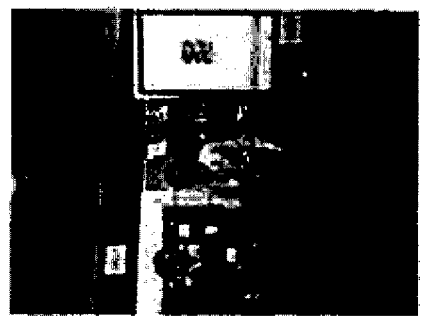
Figure 4A:
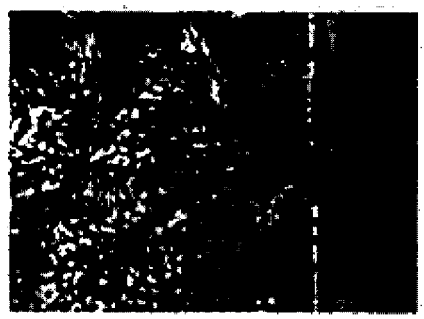
Figure 4F:
Figure 4E:

FIGS. 4A-4H show examples of images and photo tetrominoes created from corresponding salient parts of the images, according to embodiments, using methods as described for step 350 of FIG. 3. For example, one salient part of the image of FIG. 4A detected by the proprietary method is the region at which the branches meet the trunk of the tree. This salient part of FIG. 4A is shown in the "T" photo tetromino in FIG. 4B. In FIG. 4C, one salient part of the image is the two men, who are shown in the "Z" photo tetromino in FIG. 4D. In FIG. 4E, one salient part of the image is the large flower directly in the center of the image. In FIG. 4F, the flower is shown in the "L" photo tetromino, rotated ninety degrees to the left from the "L" shown in FIG. 1. In FIG. 4G, one salient part of the image is the building on the right in the forefront of the image. This building is shown in the "O" photo tetromino of FIG. 4H.

Returning to FIG. 3, in step 360, the template and location with the highest weighted saliency score are found. For templates from the set of piece types P*, the basic idea is to slide templates over the image chosen in step 350 to find the combination of template and template location with the best saliency score. A template location is the location on the image over which the template lies. For each template and template location combination, the corresponding saliency score is calculated by multiplying the saliency score of the template at the template location by the weight of the template piece type.

In embodiments, because the saliency map computation and template matching may not be what a particular user subjectively perceives to be the best template and location for an image, in embodiments, a user interface can be provided for adjusting the location of templates and images. The user interface could include other operations such as scaling, rotating and flipping, according to embodiments. In embodiments, users can select the template type for a particular photo. The extent to which these techniques are helpful will also depend on the particular game.

In embodiments, weighting is not used in the process. The process is a random process, with or without weighting. The process is random because of the random selection of an image when getting the next image in step 350. If weighting is not used, then steps 320 and 390 are unnecessary. Additionally, in step 360, the template and location with the highest saliency score are found without consideration of weighted game pieces.

In step 370, the photomino game piece is rendered into a sprite using the template as a mask over the image at the location on the image found in step 360. A sprite is a two-dimensional image that is integrated into a larger scene, in this case the video game. In embodiments, the mask is in the shape of the game piece. In embodiments, since it is often easier to implement rectangular graphical objects for the video game, the game piece could be rectangular with pixels that are outside the mask rendered transparent. In embodiments, each game piece can be composed of square objects, for example four squares for each tetromino.

In step 380, the sprite is returned to the video game application and appears in the field of play in the video game. In embodiments, for efficiency, the photominoes generated from a photo can be cached for future use by other players or games.

In step 390, the weights for each piece type are adjusted. In embodiments, the piece type most recently used for a sprite is adjusted to have a lower weight and the other piece types are adjusted to have relatively higher weights. An important consideration for the video game is to produce a good mix of piece types. This can be achieved by assigning a weight to each piece type that boosts its saliency score if the piece type has not been recently used in the game. For example, in practice, the "S" and "Z" shapes do not generally have high saliency scores without weights. This may be because naturally occurring shapes found in images tend to be roughly elliptical or rectangular. Adjusting the weights after a game piece is created increases the chances of other piece types being generated. Further, the weights make it less likely to generate another game piece of a type that has been generated with relatively high frequency.

The weight adjustments should not be drastic, however, so that the game player is not able to predict a pattern of consecutive game piece types and that a pattern of consecutive game pieces of the same type is not likely. For a simple calculation method, it is enough to reduce the wieght of the most recent game piece type by a small percentage, for example ten percent, and spread this difference evenly among the other piece types. In embodiments, this percentage can be any percentage.

The game piece type weights are calculated based on the distribution of the piece types that have been generated. In embodiments, a computation model is used, in which the probability for choosing a piece is given by its weight, the weights must all add up to 1.0. Thus, in this model, all the weights need to be adjusted and not just the most recently used piece type.

The process loops back to step 330 and waits for a request from the video game system until the game ends. If the game ends in step 340, the process ends in step 395.

A "Falling Blocks" Photominoes Game

Figure 5:
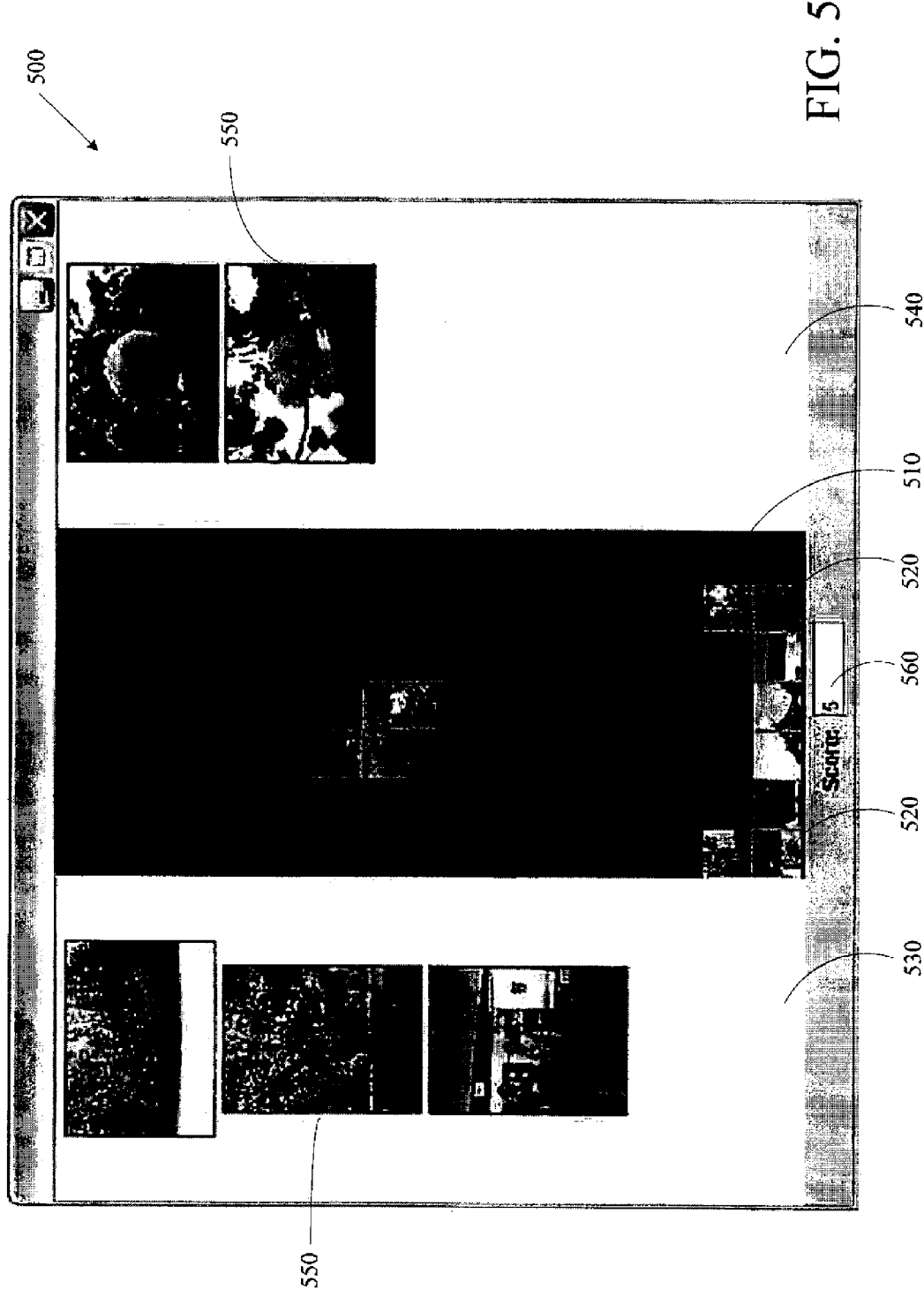
FIG. 5 shows an example screen shot of photominoes as used in a "falling blocks" game, according to embodiments.

FIG. 5 shows an example screen shot of photominoes as used in a "falling blocks" game, according to embodiments. This game provides a novel way for people to interact with and view their photos. In embodiments, photominoes for this game can be polyominoes of the case n=4, and thus are photo tetrominoes and the game is similar to Tetris. As the game proceeds, each photomino game piece in created via the process described for FIG. 3. The game's screen 500 includes a game window 510 for playing with the photominoes 520 and photo windows 530 and 540 for showing photos 550. The game window 510 is centered on the game screen 500 between the two photo windows 530 and 540. There is also a score area 560 to display the score. Game play proceeds as in classic "falling blocks," where Photominoes 520 fall downward and the user can rotate the pieces or move them side-to-side. As described above, the goal is to manipulate the falling pieces so that when they land, the pieces fit together to avoid empty spaces. When a horizontal row is completely filled, that row collapses. Cascading collapses involving successive rows is supported.

When photomino 520 is completely knocked out in the game window 510, the photo corresponding to the Photomino is displayed in one of the photo windows 530 and 540. The photo windows 530 and 540 can display several photos 550, and the most recently knocked out photos are shown. The player can pause the game action to look at the photos. The game ends when a Photomino lands in such a way that it touches the top of the game window. The score is the number of photos knocked out. In embodiments, any number of photo windows can be displayed in any arrangement relative to the game window.

For user interaction, the keyboard is used with the following mapping. The Up Arrow key rotates the active game piece, Left and Right Arrow keys move the game piece side-to-side, and the Down Arrow key increases the falling speed. The user can momentarily stop the action to look at the photos by using the Enter key to pause and to resume the game.

There are many variations of "falling blocks" game play and scoring variations. These variations can be easily adapted to the basic design. In embodiments, the game can have one or more photo windows in various positions relative to the game window on the game screen.

Generating Photominoes for Jigsaw Puzzles

Figure 6:
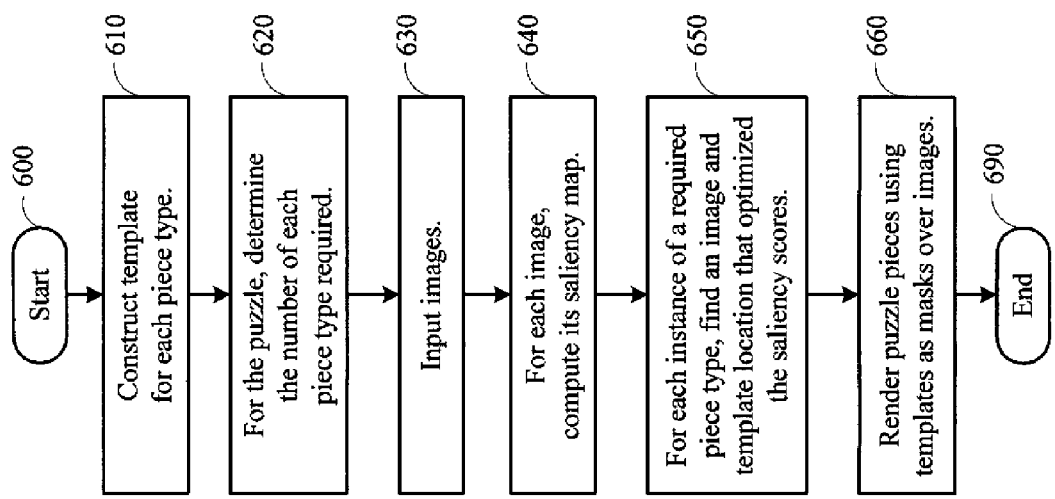
FIG. 6 is a flowchart of a process for generating photominoes as used in a jigsaw puzzle, according to embodiments.

FIG. 6 is a flowchart of a process for generating photominoes as used in a jigsaw puzzle, according to embodiments. As mentioned above, photominoes can be defined as polyominoes rendered with salient parts detected from photos or images. Polyominoes in the case of n=5 are photo pentominoes. Photo pentominoes can be used for jigsaw puzzles since pentominoes admit interesting tilings of rectangles. In embodiments, the following process, however, is for the more general version of generating photo polyominoes for jigsaw puzzles, including polyomino cases for n of any positive integer.

The process starts in step 600. For purposes of constructing photominoes, a computer program keeps an enumerated list of the polyomino of size=n piece types, including piece types obtained by rotations and flips. Let P* denote this expanded list. For example, for a polyomino of n=5, or pentominoes, P* is the set of basic piece types shown in FIG. 2 plus all combinations of rotations and flips of these pieces. In step 610, a template is constructed for each piece type in the P* list from the computer program.

In step 620, the number of each piece type required for a complete puzzle is determined. The number is requested from a photomino software module.

In step 630, the images are input for the entire jigsaw puzzle so that all game pieces can be computed at once. The images can be randomly chosen from a photo repository. In embodiments, the photo repository can be created by a user through a user interface, in which the user downloads images to the repository and selects images from the repository. In embodiments, the photomino software module uses a default directory of images on a personal computer, such as the "My Pictures" directory, if the application is running on a personal computer, for example.

In step 640, saliency maps are created for each image, as discussed above in step 350 of FIG. 3.

Figure 7D:
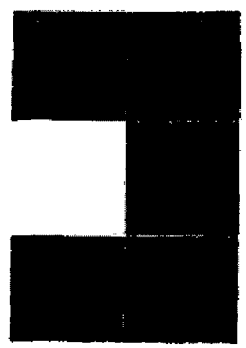
FIGS. 7A-7D show examples of images and photo pentominoes created from corresponding salient parts of the images, according to embodiments.
Figure 7C:
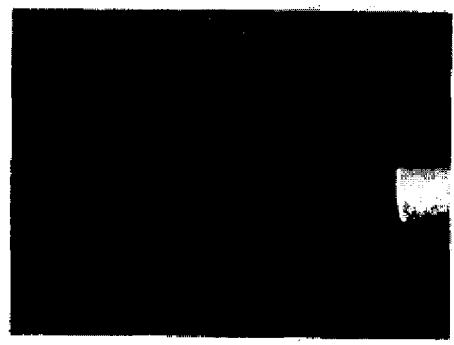
Figure 7B:
Figure 7A:

FIGS. 7A-7D show examples of images and photo pentominoes created from corresponding salient parts of the images, according to embodiments. For example, salient parts of the image in FIG. 7A are the people and the balloons. These salient parts of FIG. 7A are shown in the "W" photo tetromino in FIG. 7B. This "W" is rotated 180 degrees from the "W" shown in FIG. 2. In FIG. 7C, one salient part of the image is the two women, who are shown in the "U" photo tetromino in FIG. 7D. The photo pentominoes in FIGS. 7B and 7D show designs for puzzle pieces of a jigsaw puzzle.

Returning to FIG. 6, in step 650, for each instance of a required piece type, an image and template location that optimizes the saliency scores are found, according to embodiments. Saliency needs to be optimized given a set of images and a set of piece types from P*, along with finding the corresponding template locations. Each template location is the location on the image over which the template lies for the best saliency score. The basic idea is to slide the templates over the images to find the combination with the best saliency score. The process is slightly different depending on the kind of puzzle being targeted. Since the photomino software module is given a set of piece types to begin with, it optimizes over these piece types instead of over one piece type at a time in the video game scenario. For each piece type of the jigsaw puzzle, all images are searched for the image that provides a template location that optimizes the saliency score. For a photo collection of moderate size, all the images can be tried. For large collections, a limit can be set so that the best score of N, for example N=100, randomly selected images will be tried. Alternatively, the user can choose the images for the pieces.

In embodiments, because the saliency map computation and template matching may not be what a particular user subjectively perceives to be the best template and location for an image, in embodiments, a user interface can be provided for adjusting the location of templates and images. The user interface could include other operations such as scaling, rotating and flipping, according to embodiments. In embodiments, users can select the template type for a particular photo. The extent to which these techniques are helpful will also depend on the particular puzzle.

In step 660, the puzzle pieces can be rendered by using the templates as masks over their corresponding images at the locations on the images found in step 650. In embodiments, the mask is in the shape of the game piece. In embodiments, since it is often easier to implement rectangular graphical objects, the game piece could be rectangular with pixels that are outside the mask rendered transparent. In embodiments, each game piece can be composed of square objects, for example four squares for each tetromino. In step 690, the process ends.

Figure 8A:
FIG. 8A shows an example of photo pentominoes as jigsaw puzzle pieces, according to embodiments.
Figure 8C:
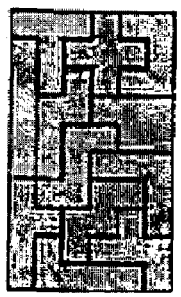
FIG. 8C shows the solution of the completed jigsaw puzzle of FIG. 8B, according to embodiments.
Figure 8B:
FIG. 8B shows an example completed jigsaw puzzle assembled from the photo pentomino pieces of FIG. 8A, according to embodiments.

FIG. 8A shows an example of photo pentominoes as jigsaw puzzle pieces, according to embodiments. These pieces are the result of the process shown in FIG. 6. When assembled, these pieces will become a collage composed of the salient regions of interest from the set of images used in FIG. 6. FIG. 8B shows an example completed jigsaw puzzle assembled from the photo pentomino pieces of FIG. 8A, according to embodiments. FIG. 8C shows the solution of the completed jigsaw puzzle of FIG. 8B, according to embodiments.

In embodiments, to improve the saliency scores of the image and template locations, the process can optimize over all or some subset of tiling solutions for the given dimensions of a puzzle. For example, given pentominoes for a ten by six jigsaw puzzle, the process can calculate the total puzzle piece saliency scores for some or all of the 2,339 solutions to find the one solution with the highest total saliency score.

In embodiments, a different kind of jigsaw puzzle can be constructed by taking a single image and partitioning it into pieces. One goal in creating these pieces is to find pieces that visually connect to each other to form the image. This type of puzzle is easier to solve than the "collage" type puzzle discussed above. In the collage type puzzle, each puzzle piece is from a different image and thus there are no hints as to which pieces belong next to each other. To create the single image jigsaw puzzle, a boundary score function can optimize over the saliency scores of the points near the boundaries of the pieces. This function measures how much the objects found in the imge is cut up. For each solution, the score is computed. The best scoring solution is superimposed over theimage to form the jigsaw puzzle. In embodiments, the best score is the highest score. In embodiments, the best score is the lowest score, which makes the puzzle more difficult to solve.

In embodiments, depending on preference, the cutting up of the salient objects in images can be minimized so that the flavor of the puzzle is to assemble objects in a composition. Cutting of objects in minimized because large sections of each image are used for to create the photominoes in a collage of photominoes corresponding to different images. In other embodiments, the cutting up of objects can be maximized so that the flavor of the puzzle is to put partial objects together to reveal the objects. Cutting of objects in images is maximized by using fewer images or even one image. The photominoes in this case are created from different parts of the fewer images to reveal one or more whole objects when the photominoes are assembled in to the jigsaw puzzle.

In embodiments, jigsaw puzzle photominoes can be played as a computer game in which players manipulate the puzzle pieces on the screen. In embodiments, the jigsaw puzzle photominoes can be printed out, either in the form of a solution on a single sheet of paper or as separate puzzle pieces in any arrangement on one or more sheets of paper. These printed out puzzle pieces can then be cut up to make physical puzzle pieces. Alternatively, if the puzzle pieces are printed out in the form of a solution, the printout can be kept intact for use as a collage.

For software jigsaw puzzles, in embodiments, a fully assembled photominoes puzzle can be rendered and viewed as a collage. In other embodiments, the puzzle can be rendered and viewed as one or more complete objects. In embodiments, software jigsaw puzzles can be shared with friends and family, who can leave the whole jigsaw puzzle "picture" intact or use it as a jigsaw puzzle.

System Hardware, Software and Components

The present invention can be conveniently implemented using a conventional general purpose or a specialized digital computer or microprocessor programmed according to the teachings of the present disclosure, as will be apparent to those skilled in the computer art.

Figure 9:
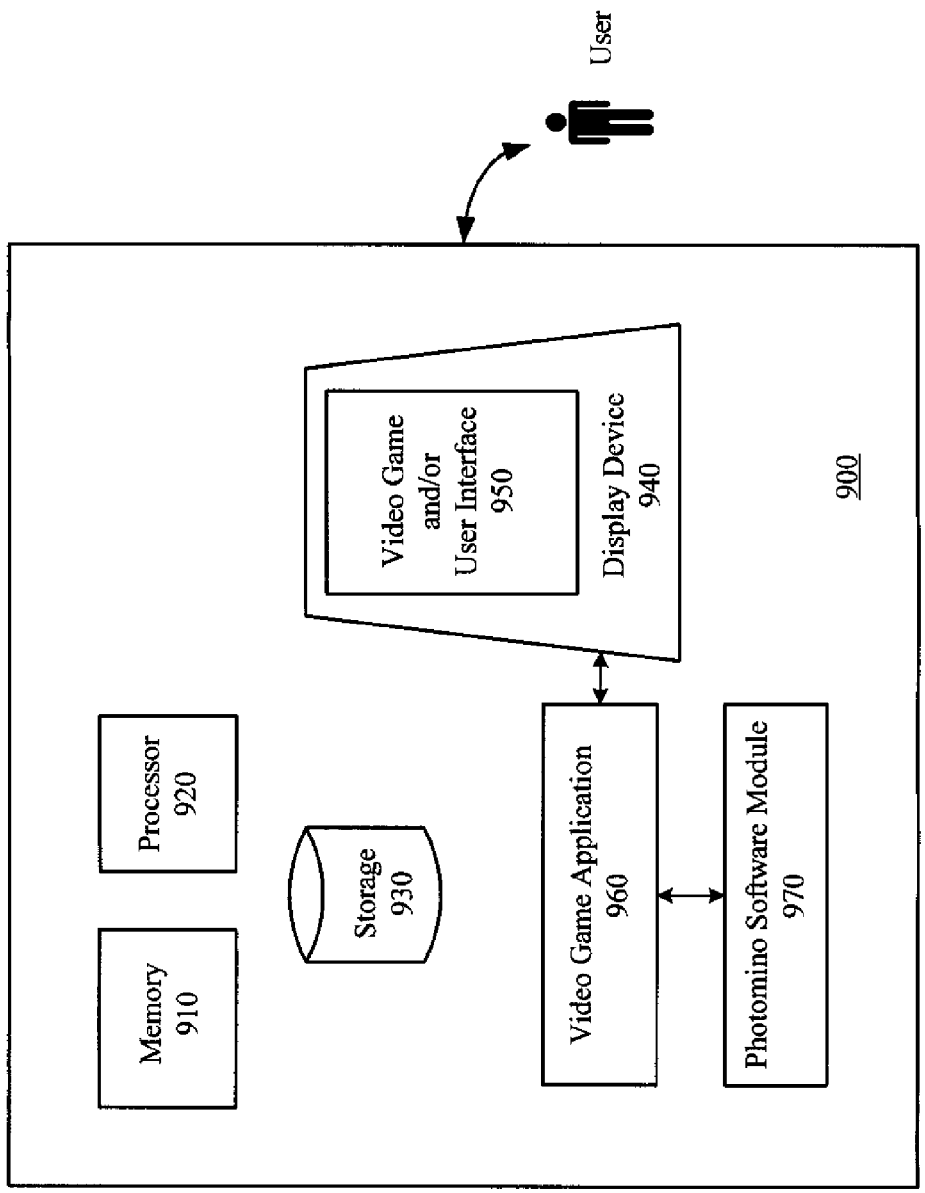
FIG. 9 shows a block diagram of an exemplary system that can be used with embodiments.

Photominoes video games and puzzles can be targeted for platforms like tabletop systems, digital cameras with games, photo printing kiosks, and online photo websites. An example of one platform, a tabletop system, is shown in FIG. 9. The tabletop system 900 typically includes one or more memories 910, one or more processors 920, and one or more storage devices or repositories 930 of some sort. The system 900 further includes a display device 940 with a screen that displays a video game and/or user interface 950. A user can interact with the video game and/or user interface via a touchscreen or other input device (not shown). System 900 includes a video game application 960 that includes both video game and puzzle applications. The video game application interfaces with the display device 940. When the video game application requires photomino game pieces, the application calls the photomino software module 970 which returns the requested photomino game pieces. The photomino software module can also provide a user interface 950 through which a user can select and view images, as well as create and manipulate photominoes, for example.

Appropriate software coding can readily be prepared by skilled programmers based on the teachings of the present disclosure, as will be apparent to those skilled in the software art. Included in the programming or software of the general/specialized computer or microprocessor are software modules for implementing the teachings of the present invention. The present invention can also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the features presented herein. The storage medium can include, but is not limited to, any type of disk including floppy disks, optical discs, DVDs, CD-ROMs, microdrives, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Various embodiments include a computer program product that can be transmitted in whole or in parts and over one or more public and/or private networks wherein the transmission includes instructions and/or information, which can be used by one or more processors to perform any of the features presented herein. In various embodiments, the transmission can include a plurality of separate transmissions.

Stored on any one of the computer readable medium (media), the present invention includes software for controlling both the hardware of the general purpose/specialized computer(s) and/or microprocessor(s), and for enabling the computer(s) and/or microprocessor(s) to interact with a human user or other mechanism utilizing the results of the present invention. Such software may include, but is not limited to, device drivers, operating systems, user interfaces and applications. Ultimately, such computer readable media further includes software for performing embodiments of the present invention.

The execution of code can be direct or indirect. The code can include compiled, interpreted and other types of languages. Unless otherwise limited by claim language, the execution and/or transmission of code and/or code segments for a function can include invocations or calls to other software or devices, local or remote, to do the function. The invocations or calls can include invocations or calls to library modules, device drivers, interface drivers and remote software to do the function. The invocations or calls can include invocations or calls in distributed and client/server systems.

The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. Other features, aspects and objects of the invention can be obtained from a review of the figures and the claims. It is to be understood that other embodiments of the invention can be developed and fall within the spirit and scope of the invention and claims. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method for generating a photomino game piece for use in a polyomino video game application, the method comprising:
   at a computer system including one or more processors and memory storing one or more programs, the one or more processors executing the one or more programs to perform the operations of:
   constructing a set of templates for a set of polyomino game piece types, wherein a respective template is constructed for a respective polyomino game piece type, and the set of polyomino game piece types includes polyomino game piece types having a predetermined size;
   computing a plurality of saliency scores for an image in the polyomino video game application, each of the saliency scores being associated with a respective location on the image, wherein the saliency score for the respective location is increased if the respective location comprises one or more of the following: high variation of texture, high variation of colors, high variation of shapes, a face, a person, and a center of the image;
   for the image, finding a combination of a template from the set of templates and a location on the image with a highest saliency score; and
   rendering, for display in the polyomino video game application, the photomino game piece based on the template and the location on the image.

2. The method of claim 1, wherein finding the combination of the template and the location on the image with the highest saliency score comprises:
   computing a saliency map for the image;
   until the template is at the location on the image having the highest saliency score,
   placing the template over the image at a respective location; and
   calculating the saliency score for the template at the respective location based at least in part on the saliency map for the image.

3. The method of claim 2, wherein computing the saliency map for the image comprises:
   partitioning the image into a grid of blocks; and
   assigning a saliency score to each block.

4. The method of claim 3, wherein the saliency score of a respective block is increased if the respective block comprises one or more of the following: high variation of texture, high variation of colors, high variation of shapes, a face, a person, and a center of the image.

5. The method of claim 1, wherein rendering the photomino game piece comprises rendering the photomino game piece into a sprite using the template as a mask over the image.

6. A computer-implemented method for generating photomino game pieces for use in a polyomino video game application, the method comprising the following steps:
at a computer system including one or more processors and memory storing one or more programs, the one or more processors executing the one or more programs to perform the operations of:
constructing a set of templates for a set of polyomino game piece types, wherein a respective template is constructed for a respective polyomino game piece type, the set of polyomino game piece types includes polyomino game piece types having a predetermined size, and the polyomino game piece types are associated with weights; and
when the polyomino video game application requests a photomino game piece:
retrieving an image from a plurality of images;
finding a combination of a template from the set of templates and a location on the image with the highest saliency score, wherein the finding includes multiplying a saliency score of the template at the location on the image by the weight of the polyomino game piece type corresponding to the template;
rendering the photomino game piece based on the template and the location on the image; and
returning the photomino game piece to the polyomino video game application for display.

7. The method of claim 6, wherein retrieving the image from the plurality of images comprises retrieving the image from a photo repository.

8. The method of claim 6, further comprising:
after constructing the set of templates for a set of polyomino game piece types, initializing the weights of the polyomino game piece types to the same weight; and
after rendering the photomino game piece based on the template and the location on the image, adjusting the weights for the polyomino game piece types.

9. The method of claim 8, wherein adjusting the weights for the polyomino game piece types comprises:
assigning a lower weight to the polyomino game piece type most recently rendered; and
assigning higher weights to the other polyomino game piece types.

10. A non-transitory computer-readable storage medium storing instructions for execution by a computer, wherein the instructions include instructions to:
construct a set of templates for a set of polyomino game piece types, wherein a respective template is constructed for a respective polyomino game piece type, and the set of polyomino game piece types includes polyomino game piece types having a predetermined size;
compute a plurality of saliency scores for an image in the polyomino video game application, each of the saliency scores being associated with a respective location on the image, wherein the saliency score for the respective location is increased if the respective location comprises one or more of the following: high variation of texture, high variation of colors, high variation of shapes, a face, a person, and a center of the image;
for the image, find a combination of a template from the set of templates and a location on the image with a highest saliency score; and
render, for display in a polyomino video game application, the photomino game piece based on the template and the location on the image.

11. A non-transitory computer-readable storage medium storing instructions for execution by a computer, wherein the instructions include instructions to:
construct a set of templates for a set of polyomino game piece types, wherein a respective template is constructed for a respective polyomino game piece type, the set of polyomino game piece types includes polyomino game piece types having a predetermined size, and the polyomino game piece types are associated with weights; and
when a polyomino video game application requests a polyomino game piece:
retrieve an image from a plurality of images;
find a combination of a template from the set of templates and a location on the image with the highest saliency score, wherein the finding includes multiplying a saliency score of the template at the location on the image by the weight of the polyomino game piece type corresponding to the template;
render the photomino game piece based on the template and the location on the image; and
return the photomino game piece to the polyomino video game application for display.

12. A computer-implemented method for generating a photomino game piece for use in a polyomino video game application, the method comprising:
at a computer system including one or more processors and memory storing one or more programs, the one or more processors executing the one or more programs to perform the operations of:
computing a plurality of saliency scores for an image in the polyomino video game application, each of the saliency scores being associated with a respective location on the image, wherein the saliency score for the respective location is increased if the respective location comprises one or more of the following: high variation of texture, high variation of colors, high variation of shapes, a face, a person, and a center of the image;
for the image, finding a combination of a template from a set of templates and a location on the image with a highest saliency score, wherein a respective template corresponds to a respective polyomino game piece type, and the set of polyomino game piece types includes polyomino game piece types having a predetermined size; and
rendering, for display in the polyomino video game application, the photomino game piece based on the template and the location on the image.

* * * * *